US012233031B2

(12) United States Patent
Singh et al.

(10) Patent No.: US 12,233,031 B2
(45) Date of Patent: Feb. 25, 2025

(54) CLOSING STATION, CAPSULE FILLING MACHINE AND METHOD THEREOF

(71) Applicants: Scitect Centet, Mumbai (IN); ACG Pam Pharm Technologies Pvt. LTD, Mumbai (IN)

(72) Inventors: Karan Singh, Mumbai (IN); Roy Cook, Mumbai (IN); James D'Silva, Mumbai (IN)

( * ) Notice: Subject to any disclaimer, the term of this patent is extended or adjusted under 35 U.S.C. 154(b) by 92 days.

(21) Appl. No.: 17/918,315

(22) PCT Filed: Apr. 8, 2021

(86) PCT No.: PCT/IN2021/050352
§ 371 (c)(1),
(2) Date: Oct. 11, 2022

(87) PCT Pub. No.: WO2021/210011
PCT Pub. Date: Oct. 21, 2021

(65) Prior Publication Data

US 2023/0135053 A1 May 4, 2023

(30) Foreign Application Priority Data

Apr. 13, 2020 (IN) ............................ 202021015979

(51) Int. Cl.
*A61J 3/07* (2006.01)

(52) U.S. Cl.
CPC ............ *A61J 3/072* (2013.01); *A61J 2200/70* (2013.01)

(58) Field of Classification Search
CPC .............................. A61J 3/072; A61J 2200/70
USPC ........................................................... 53/476
See application file for complete search history.

(56) References Cited

U.S. PATENT DOCUMENTS

| | | | | |
|---|---|---|---|---|
| 186,482 | A | 1/1877 | Kinyon et al. | |
| 213,518 | A | 3/1879 | McGregor | |
| 417,935 | A | 12/1889 | Ott | |
| 522,044 | A | 6/1894 | Carlyle | |
| 548,638 | A | 10/1895 | Hedges et al. | |
| 4,089,152 | A * | 5/1978 | Zanasi | B65B 43/42 53/281 |
| 5,626,171 | A * | 5/1997 | Mirri | B65B 1/385 141/81 |
| 7,726,101 | B2 * | 6/2010 | Frabetti | B65B 1/32 53/473 |
| 9,170,213 | B2 | 10/2015 | Runft | |

(Continued)

OTHER PUBLICATIONS

U.S. Appl. No. 17/932,730, filed Sep. 16, 2022, Steffen Gall.

(Continued)

*Primary Examiner* — Sameh Tawfik

(57) ABSTRACT

The present invention discloses a closing station for a capsule filling machine comprising a bottom and a top closing unit configured to displace towards each other, such that bottom pins associated with said bottom closing unit urge into through holes of a body holder (B) to contact closed ends of each filled capsule body sections and sliding them into said open ends of each capsule cap sections, such that each capsule is partially closed against an exerting pre-compressive force of the top pins and is completely closed when force against biasing means of said top pins is exerted for providing telescoping closing of the cap and body sections of each capsule.

8 Claims, 7 Drawing Sheets

(56) References Cited

U.S. PATENT DOCUMENTS

| | | | | |
|---|---|---|---|---|
| 10,023,332 | B2 * | 7/2018 | Gamberini | B65B 1/06 |
| 10,641,669 | B2 | 5/2020 | Schlipf | |
| 2001/0035431 | A1 * | 11/2001 | Runft | A61J 3/074 141/81 |
| 2008/0056866 | A1 * | 3/2008 | Ansaloni | A61J 3/074 414/800 |
| 2008/0141621 | A1 * | 6/2008 | Funaro | A61J 3/072 53/138.1 |
| 2010/0078093 | A1 * | 4/2010 | Ansaloni | B65B 37/02 53/900 |
| 2017/0216147 | A1 * | 8/2017 | Franck | G01B 7/14 |

OTHER PUBLICATIONS

U.S. Appl. No. 11/996,481, filed Jul. 24, 2006, Roberto Trebbi.
U.S. Appl. No. 17/595,145, filed Apr. 29, 2020, Vinay Jain.
U.S. Appl. No. 16/432,605, filed Jun. 5, 2019, Michael Jeschke.
U.S. Appl. No. 14/414,133, filed May 15, 2013, Walter Boehringer.
U.S. Appl. No. 15/136,037, filed Apr. 22, 2016, Jan Fabian Scheffler.
U.S. Appl. No. 15/514,557, filed Jul. 31, 2015, Thomas Franck.
U.S. Appl. No. 11/381,634, filed May 4, 2006, Mario Senesi.
U.S. Appl. No. 14/716,017, filed May 19, 2015, Il Elbern Calvert.
U.S. Appl. No. 14/868,973, filed Sep. 29, 2015, Jan Fabian Scheffler.
U.S. Appl. No. 10/588,506, filed Feb. 23, 2005, Caterina Funaro.
U.S. Appl. No. 12/376,219, filed Jul. 19, 2007, Gabriel M. McCutcheon.
U.S. Appl. No. 10/568,506, filed May 9, 2005, Roberto Trebbi.
U.S. Appl. No. 12/668,350, filed Jul. 7, 2008, Peter Stoeckel.
U.S. Appl. No. 07/254,624, filed Oct. 7, 1988, Eberhard Krieger.
U.S. Appl. No. 09/550,281, filed Apr. 14, 2000, Taizo Yamamoto.
U.S. Appl. No. 06/091,847, filed Jun. 11, 1979, Libero Facchini.
U.S. Appl. No. 05/888,845, filed Mar. 22, 1978, Leonard H. Austin.
U.S. Appl. No. 12/090,643, filed Oct. 18, 2006, Klaus Julius.
International Search Report for PCT/EP2008/058734 mailed Oct. 7, 2008.

* cited by examiner

CLOSING STATION, CAPSULE FILLING MACHINE AND METHOD THEREOF

TECHNICAL FIELD OF THE INVENTION

The present invention relates to a closing station of a capsule filling machine that provides efficient closure and segregation of capsules.

BACKGROUND OF THE INVENTION

A capsule is typically made of two prefabricated cylindrical shells referred to as a cap and a body, one end of each of which is rounded and closed, and the other end of which is open. In a capsule filling machine, a pharmaceutical and/or a nutraceutical ingredient is filled in the body of the capsule and the cap is inserted over the body to telescopically join the cap and body. Generally, the cap concentrically overlaps the body when the cap and body are telescopically joined.

Referring FIG. 1, shows a conventional capsule filling machine typically comprising a turret (T) in the form of a turn-table comprising a plurality of capsule holders (CSH) circumferentially mounted thereon. Each capsule holder (CSH) comprises a cap holder (C) and a body holder (B) each having plurality of through-holes (O). Typically, the cap holders (C) are mounted on the top of the turret (T), and the body holders (B) are affixed to the side or bottom of the turret (T) in a manner such that the body holders (B) can slide out of the turret (T) to enable filling of the pharmaceutical/nutraceutical ingredients in empty capsule bodies held in the body holders (B). The turret (T) rotates, as denoted by arrow (TR), through plurality of stations such as a loading station (1) for loading empty capsules; an orientation station (2) for automatically orienting the empty capsules in a predetermined orientation where the cap of each capsule is on top and the body of each capsule is below the cap, and separating the cap and the body of each capsule in the cap holder (C) and the body holder (B) respectively; a cap sensing station (3) for checking and confirming the presence of the cap of each capsule in the cap holder (C); a body sensing station for checking and confirming the presence of body of each capsule in the body holder (B), a tamping station (5), etc., for filling one or more pharmaceutical/nutraceutical ingredients in each capsule body in the body holder (B); unopened capsule ejection station (7) for ejecting unopened capsules; a closing station (9) for closing the cap and the body of each capsule to form filled capsules; filled capsule ejection station (11) with a capsule ejection chute (11*a*) for ejecting the filled capsules typically into a collector placed there below; and a cleaning station (12) for cleaning the bushes i.e. holes in the capsule cap holder (C) and body holder (B). The turret (T) may comprise optional stations (4, 6, 8, 10) for performing additional functions such as a pellet filling or a liquid filling, checking the filled capsules for compliance with predefined quality parameters, rejecting the capsules not complying with the predefined quality parameters.

However, in such conventional capsule filling machines there may be instances where the cap and body sensing station may not function accurately to check the presence of the cap and body of each capsule in the cap and body holder. Further in such instances body or cap may bounce from their respective through-holes resulting in a capsule with only cap or body and therefore the capsule can no longer be sealed or processed. This can even lead to an interruption in operation and such improper filling and closing of capsules at the closing station causes wastage of the pharmaceutical/nutraceutical ingredients and economic losses.

Furthermore, the closing station used in such conventional capsule filling machine are normally spring loaded which only close the capsules and also measure the force during capsules closing. The body of the capsule is pushed into the cap against a lid covering the cap sections to telescopically join the cap and body. The pressure and the compression force applied may exceed and there is no mechanism to adjust the force responsively to form a good capsule and only results in a dented capsule. This also leads to wastage of time and material and inefficient functioning of capsule filling machine as there is no segregation of good and bad capsules at this stage.

Therefore, there is a need to overcome one or more of the aforementioned problems.

SUMMARY OF THE INVENTION

Accordingly, an aspect of the present invention discloses a closing station for a capsule filling machine, said station comprising a bottom closing unit positioned underneath a body holder of the capsule filling machine having a plurality of capsule body sections therein, said bottom closing unit having a bottom pin for each capsule body section axially aligned with a corresponding vertical through-hole of said body holder; a top closing unit positioned overhead a cap holder having a capsule cap section therein for each capsule body section, said top closing unit having a top pin for each cap section axially aligned with a corresponding vertical through-hole of said cap holder; and a control unit configured to initiate vertical displacement of said bottom and top closing units towards each other; urge each said bottom pin into said through-holes of said body holder to contact and slide closed ends of each capsule body sections into said open ends of each capsule cap sections; close cap and body sections of each capsule partially against an exerting pre-compressive force of said top pins; and close cap and body sections of each said partially closed capsule telescopingly and completely against an exerting biasing force of a biasing means positioned within said top pins.

According to an embodiment, the control unit is in communication with a sensing means positioned within said top closing unit, said control unit is configured to: receive a positive feedback signal generated by said sensing means on sensing biasing of said top pins to a predetermined threshold position, indicative of complete telescopic closure of good capsule with both said body section and cap section, and invoke a control signal based on said generated positive feedback signal to segregate and remove only said good capsules from capsule holders.

According to the embodiment, the control unit is in communication with a first sensing means and a second sensing means equidistantly spaced apart and positioned adjacent to said top pins within said top closing unit, said control unit is configured to: receive a positive feedback signal generated only by said first sensing means on sensing biasing of said top pins to only a first predetermined threshold position, indicative of complete telescopic closure of good capsule having both said body section and cap section; receive a positive feedback signal generated by said first sensing means and said second sensing means on sensing biasing of said top pins to first and a second predetermined threshold position, indicative of incomplete telescopic closure of capsule having a dent either in said body section or cap section; and receive negative feedback signal generated by said first sensing means and/or said second sensing means indicative of non-biasing of said top pins to said first and/or second predetermined threshold position, and non-telescoped capsule with either only said body section or cap section.

According to the embodiment, the control unit is configured to invoke a control signal based on said received positive feedback signal generated by said first sensing means to segregate and remove only said good capsules from capsule holders; invoke a control signal based on said received positive feedback signal generated by said first and second sensing means to reject dent capsule; and invoke a control signal based on said received negative feedback signal generated by said first and/or second sensing means to reject non-telescoped capsule.

According to the embodiment, the control unit is configured to displace said bottom and top closing units with a predetermined pressure in synchronized time intervals.

According to the embodiment, the biasing means includes a spring.

According to the embodiment, the body and cap holders include at least one row of predetermined diameters configured to accommodate plurality of said body and cap sections.

According to the embodiment, each said top pin includes at least one stepped surface to aid biasing of said top pins.

According to the embodiment, the predetermined threshold position, first and/or second predetermined threshold positions, are determined by said control unit.

According to another aspect, the present invention discloses a capsule filling machine comprising: a closing station including: a bottom closing unit positioned underneath a body holder of the capsule filling machine having a plurality of capsule body sections therein, said bottom closing unit having a bottom pin for each capsule body section axially aligned with a corresponding vertical through-hole of said body holder; a top closing unit positioned overhead a cap holder having a capsule cap section therein for each capsule body section, said top closing unit having a top pin for each cap section axially aligned with a corresponding vertical through-hole of said cap holder, at least one sensing means configured to sense biasing of each said top pins to a predetermined threshold position, indicative of complete telescopic closure of good capsule with both said body section and cap section; and a control unit in communication with said at least one sensing means is configured to receive a positive feedback signal and invokes a control signal based on said generated positive feedback signal to segregate and remove only said good capsules from capsule holders.

According to the embodiment, the control unit is configured to: initiate vertical displacement of said bottom and top closing units towards each other; urge each said bottom pin into said through-holes of said body holder to contact and slide closed ends of each capsule body sections into said open ends of each capsule cap sections; close cap and body sections of each capsule partially against an exerting pre-compressive force of said top pins; and close cap and body sections of each said partially closed capsule telescopingly and completely against an exerting biasing force of a biasing means positioned within said top pins.

According to the embodiment, the at least one sensing means is positioned within said top closing unit.

According to the embodiment, the control unit is in communication with a first sensing means and a second sensing means equidistantly spaced apart and positioned adjacent to said top pins within said top closing unit, said control unit is configured to: receive a positive feedback signal generated only by said first sensing means on sensing biasing of said top pins to only a first predetermined threshold position, indicative of complete telescopic closure of good capsule having both said body section and cap section; receive a positive feedback signal generated by said first sensing means and said second sensing means on sensing biasing of said top pins to first and a second predetermined threshold position, indicative of incomplete telescopic closure of capsule having a dent either in said body section or cap section; and receive negative feedback signal generated by said first sensing means and/or said second sensing means indicative of non-biasing of said top pins to said first and/or second predetermined threshold position, and non-telescoped capsule with either only said body section or cap section.

According to the embodiment, control unit is configured to invoke a control signal based on said received positive feedback signal generated by said first sensing means to segregate and remove only said good capsules from capsule holders; invoke a control signal based on said received positive feedback signal generated by said first and second sensing means to reject dent capsule; and invoke a control signal based on said received negative feedback signal generated by said first and/or second sensing means to reject non-telescoped capsule.

According to one another aspect, the present invention discloses a method of operating a closing station of a capsule filling machine, the method comprising the steps of: initiating, by a control unit, a vertical displacement of a bottom closing unit and a top closing unit towards each other for urging bottom pins to contact and slide closed ends of each capsule body sections into open ends of each capsule cap sections; closing, by a control unit, cap and body sections of each capsule partially against an exerting pre-compressive force of said top pins; closing, by a control unit, cap and body sections of each said partially closed capsule telescopingly and completely against an exerting biasing force of a biasing means positioned within said top pins; processing, by a control unit, plurality of received feedback signals generated by said first sensing means and second sensing means; and invoking, by a control unit, a control signal based on said received positive feedback signal to segregate and remove only good capsules having both said body sections and cap sections from capsule holders.

BRIEF DESCRIPTION OF THE DRAWINGS

The above and other aspects, features, and advantages of certain exemplary embodiments of the present invention will be more apparent from the following description taken in conjunction with the accompanying drawings in which:

FIG. 2 through FIGS. 2A to 2F shows a closing station for a capsule filling machine according to an aspect of the present invention, FIG. 2A shows the closing station with bottom and top closing units under normal position prior to start of operation, according to the present invention;

FIG. 2F shows the closing station in operation showing detection of closed capsules but with a dent or improper fit of cap and body which is to be rejected, according to the present invention.

Figure 1:
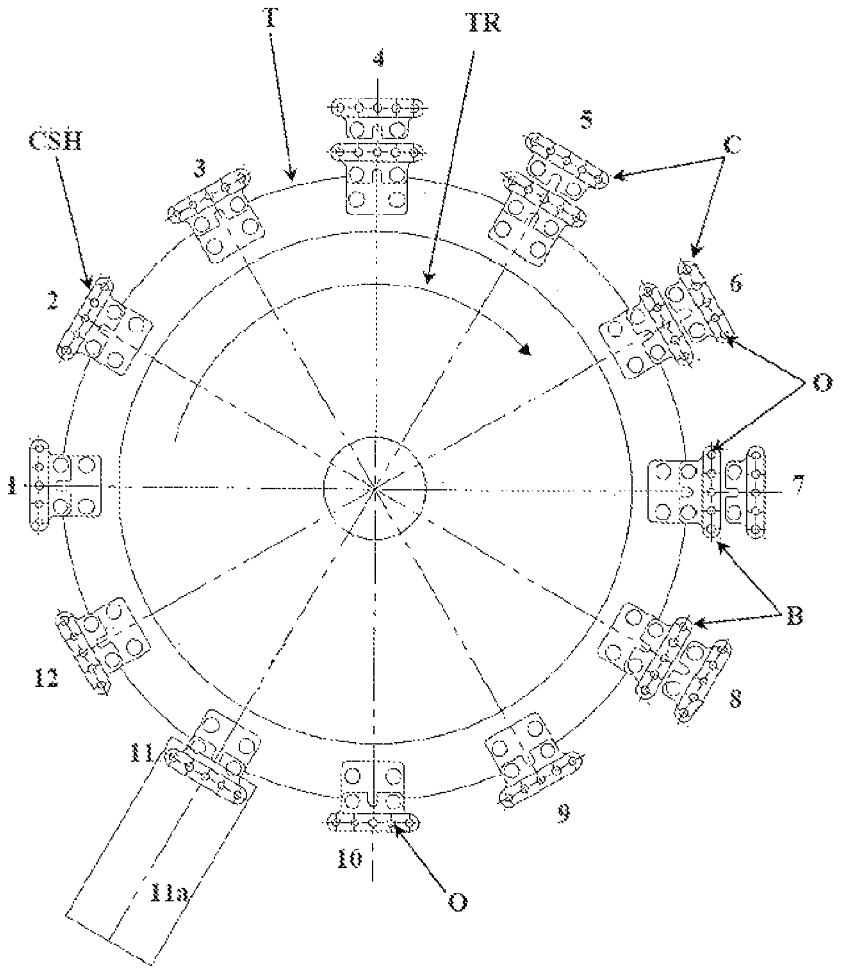
FIG. 1 shows a conventional capsule filling machine.

Persons skilled in the art will appreciate that elements in the figures are illustrated for simplicity and clarity and may have not been drawn to scale. For example, the dimensions of some of the elements in the figure may be exaggerated relative to other elements to help to improve understanding of various exemplary embodiments of the present disclosure.

Throughout the drawings, it should be noted that like reference numbers are used to depict the same or similar elements, features, and units.

DETAILED DESCRIPTION OF THE EMBODIMENTS OF THE INVENTION

In general, the present invention claims a closing station for a capsule filling machine comprising a bottom and a top closing unit configured to displace towards each other, such that bottom pins associated with the bottom closing unit urge into through holes of a body holder to contact closed ends of filled capsule body sections and sliding them into the open ends of each capsule cap sections, such that each capsule is partially closed against an exerting pre-compressive force of the top pins and is completely closed when force against biasing means of the top pins is exerted for providing telescoping closing of the cap and body sections of each capsule.

Other aspects, advantages, and salient features of the invention will become apparent to those skilled in the art from the following detailed description, which, taken in conjunction with the annexed drawings, discloses exemplary embodiments of the invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents. For example, top and bottom closing units, top and bottom pins, first and second sensing means, first and second predetermined threshold positions, etc. are referred in the description for the purpose of the understanding and nowhere limit the invention. The rows of through-holes, elongated top and bottom pins, closing units, body and cap holders, sensing means, and biasing means nowhere limits to the particular number and arrangement disclosed in the invention. Further, the vertically, axially, and adjacently are referred in the description for the purpose of the understanding and nowhere limit the invention.

Figures discussed below, and the various embodiments used to describe the principles of the present disclosure in this patent document are by way of illustration only and should not be construed in any way that would limit the scope of the disclosure. Those skilled in the art will understand that the principles of the present disclosure may be implemented in any suitably arranged environment. The terms used to describe various embodiments are exemplary. It should be understood that these are provided to merely aid the understanding of the description, and that their use and definitions in no way limit the scope of the invention.

Figure 2A:
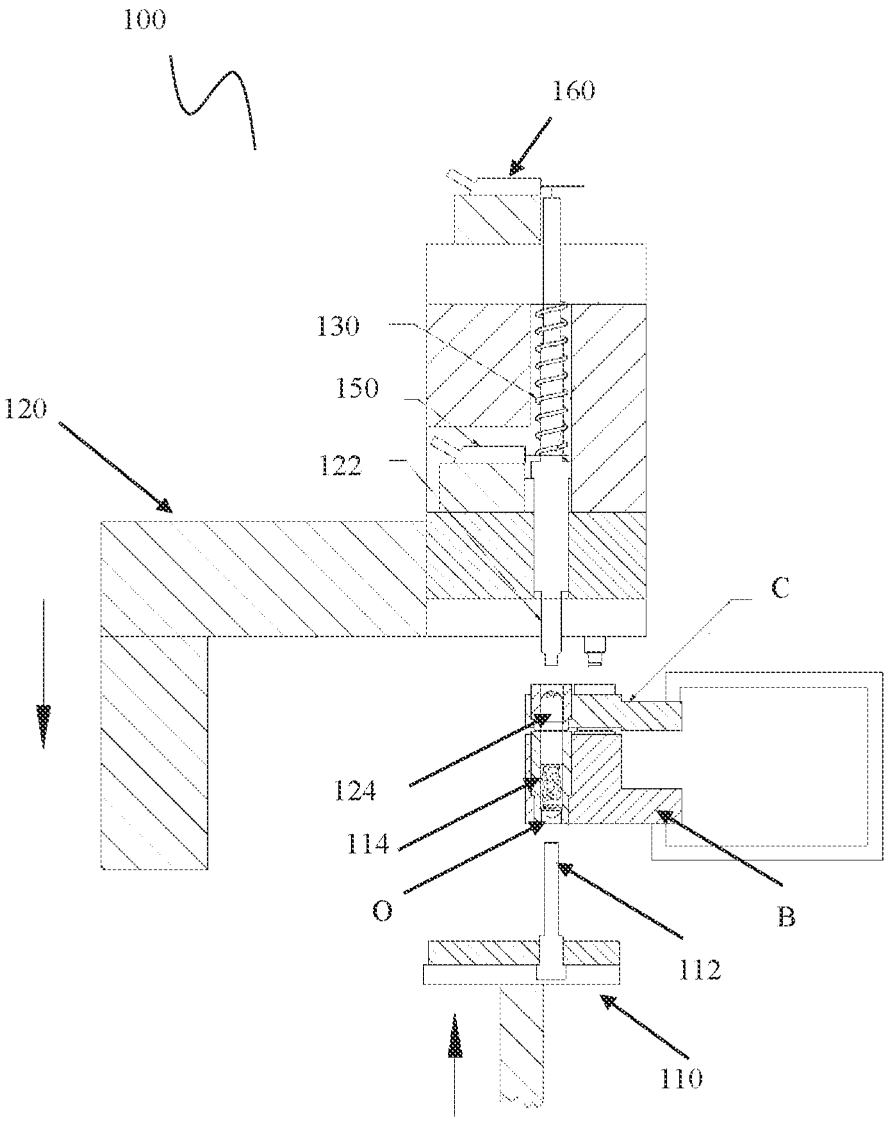
Figure 2B:
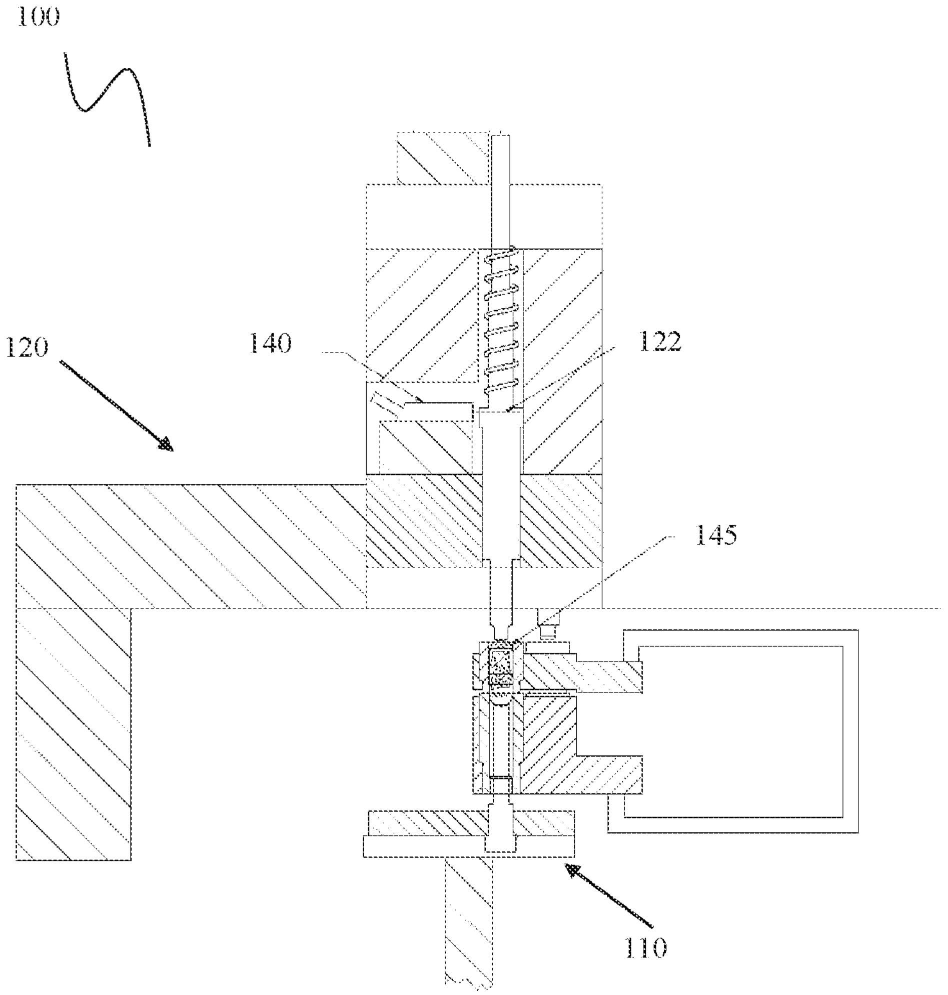
FIG. 2B shows the closing station having a sensing means in operation providing efficient closure of capsule with both said body section and cap section, according to an aspect of the present invention.
Figure 2C:
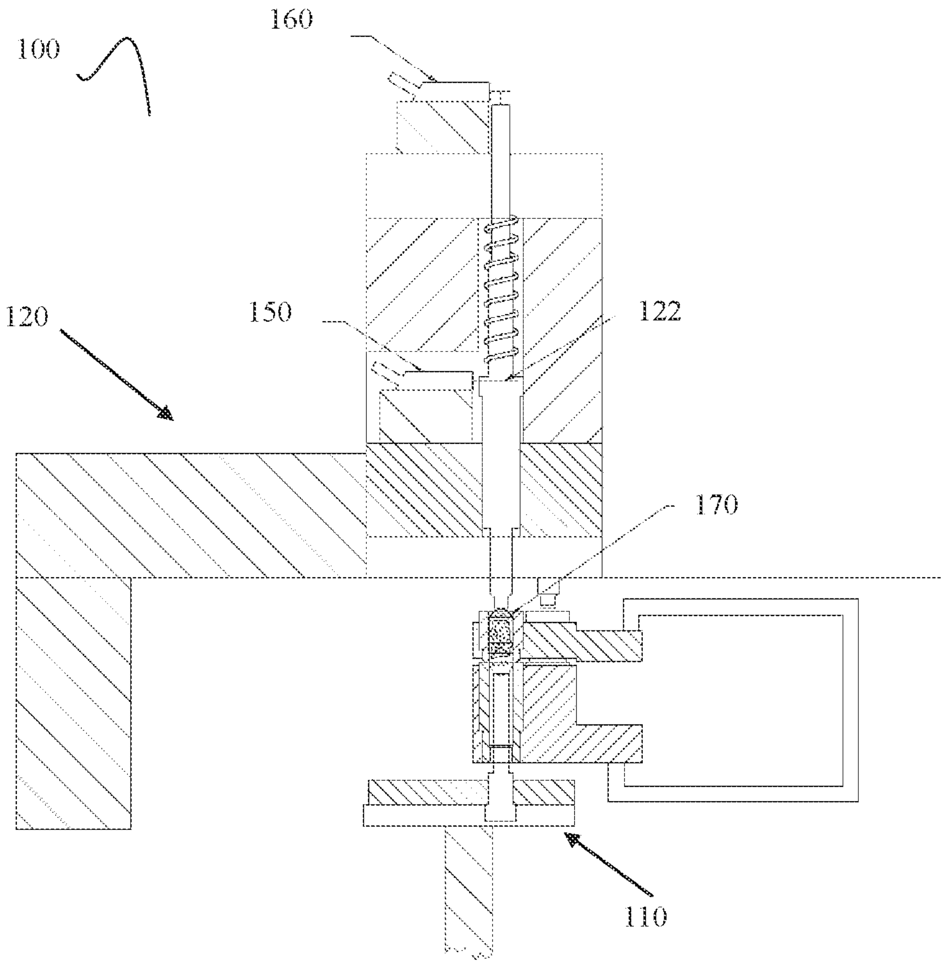
FIG. 2C shows the closing station in operation providing efficient closure and detection of good capsules, according to another aspect of the present invention.
Figure 2D:
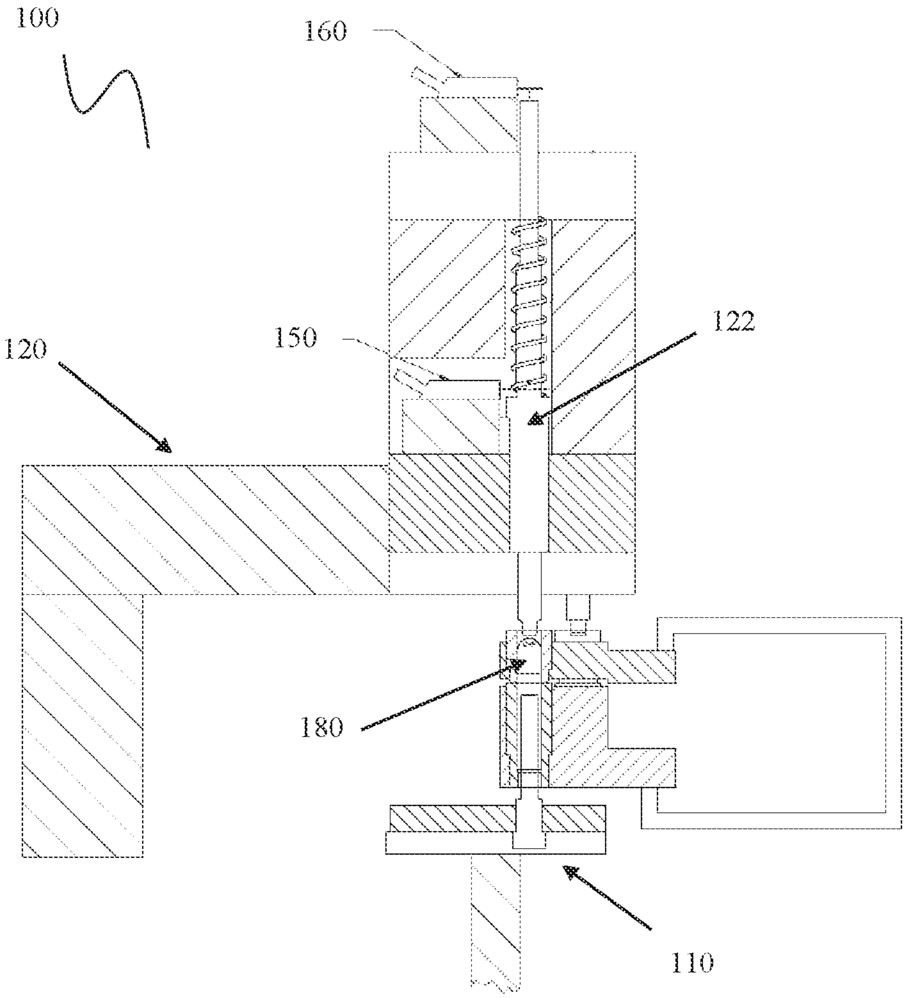
FIG. 2D shows the closing station in operation showing detection of capsules with only cap to be rejected, the cap is rejected because body is not sensed according to the present invention.
Figure 2E:
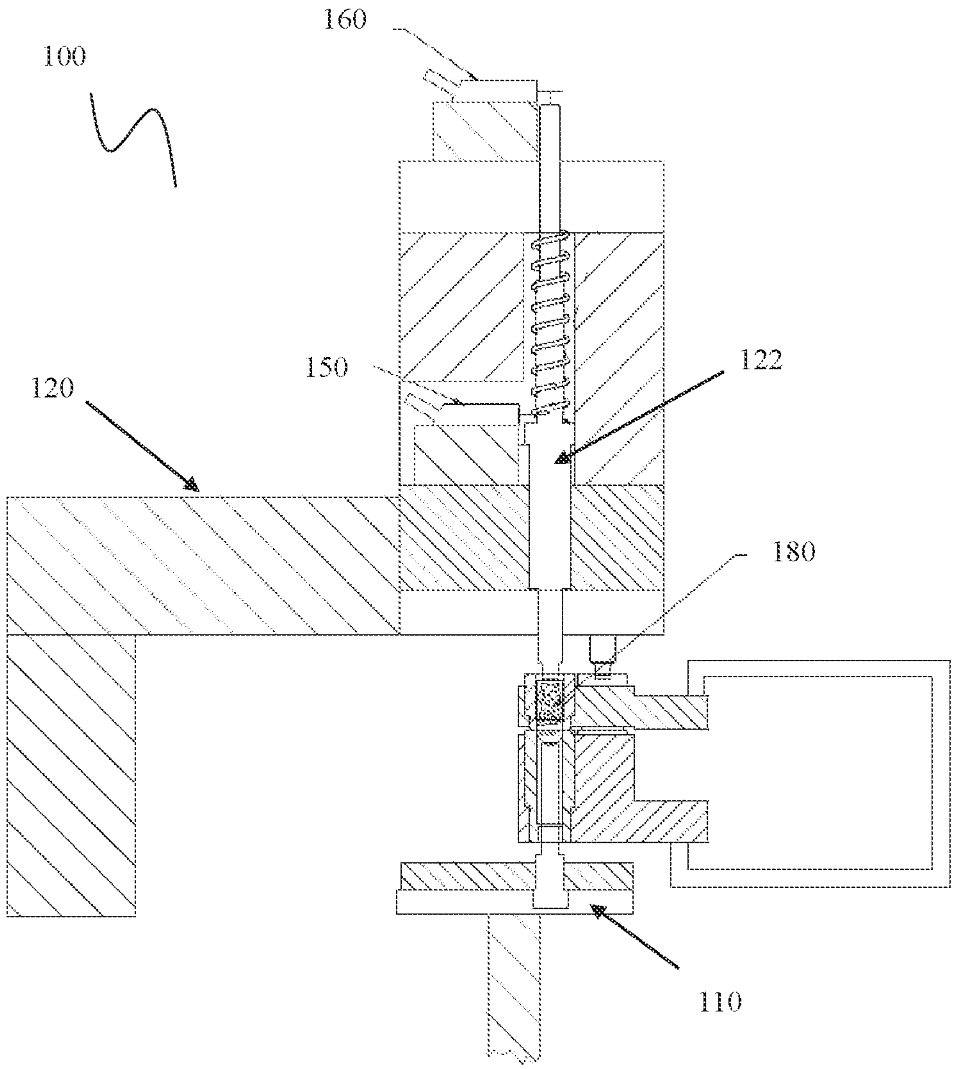
FIG. 2E shows the closing station in operation showing detection of capsules with only body to be rejected, the body is rejected because cap is not sensed according to the present invention.
Figure 2F:
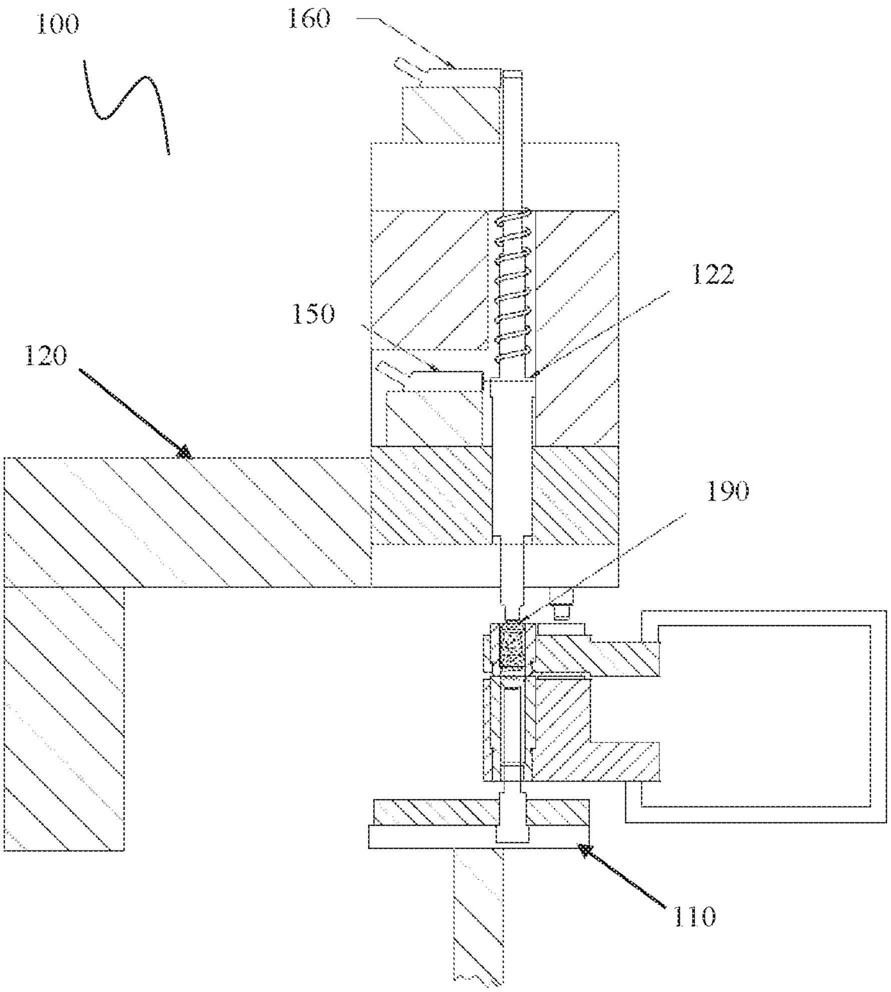

Referring FIG. 2 through FIGS. 2A to 2F shows a closing station (100) for a capsule filling machine according to a preferred aspect of the present invention. As shown in FIG. 2A the closing station (100) is under normal position prior to start of operation. According to a preferred embodiment, closing station (100) comprising a bottom closing unit (110) positioned underneath a body holder (B) having a plurality of capsule body sections (114) therein. The bottom closing unit has a bottom pin (112) for each capsule body section (114) axially aligned with a corresponding vertical through-hole (O) of said body holder (B).

According to the embodiment, a top closing unit (120) positioned overhead a cap holder (C) having a capsule cap section (124) therein for each capsule body section (114). The top closing unit having a top pin (122) for each cap section (124) axially aligned with a corresponding vertical through-hole (O) of said cap holder. The top closing unit (120) includes a first sensing means (150) and a second sensing means (160).

Referring FIG. 2B shows the closing station (100) having a sensing means (140) in operation providing efficient closure of capsule with both said body section (114) and cap section (124), according to another aspect of the present invention. As seen in FIG. 2B, a control unit (not shown) initiates vertical displacement of the bottom (110) and top (120) closing units towards each other, urging the bottom pins (112) into the through-holes (O) of the body holder (B) to contact closed ends of each capsule body sections (114) and sliding them into the open ends of each capsule cap sections (124), such that a capsule is partially closed against an exerting pre-compressive force of the top pins (122) and is completely closed when force against biasing means of the top pins (122) is exerted for providing telescoping closing of the cap (124) and body sections (114) of each capsule.

According to the embodiment, top closing unit (120) includes a sensing means (140) positioned vertically and adjacent to said top pins (122). The control unit is configured to receive a positive feedback signal generated by said sensing means (140) on sensing biasing of said top pins (122) to a predetermined threshold position, indicative of complete telescopic closure of good capsule (170) with both said body section (114) and cap section (124), and invoke a control signal based on said generated positive feedback signal to segregate and remove only said good capsules (170) from capsule holders.

According to the embodiment, the sensing means (140) further segregates capsules by triggering no signal when there is no biasing of said top pins (122) to both said predetermined threshold position thereby indicating a capsule with either said body section (114) or cap section (124) to be rejected.

According to the present invention, the control unit is configured to control removal of only good capsules (145) from capsule holders based on the responsive signal.

According to the embodiment, each said top pin (122) includes at least one stepped surface to aid biasing of said top pins (122).

Referring FIG. 2C shows the closing station (100) in operation providing efficient closure and detection of good capsules, according to the preferred aspect of present invention. As seen in FIG. 2C, top closing unit (120) includes a first sensing means (150) and a second sensing means (160) equidistantly spaced apart and positioned vertically adjacent to said top pins (122), configured for closing and segregation of capsules. The control unit is in communication with a first sensing means (150) and a second sensing means (160) is configured to receive a positive feedback signal generated only by said first sensing means (150) on sensing biasing of said top pins (122) to only a first predetermined threshold position, indicative of complete telescopic closure of good capsule (170) having both said body section (114) and cap section (124) and invoke a control signal based on said received positive feedback signal generated by said first sensing means (150) to segregate and remove only said good capsules (170) from capsule holders;

According to the embodiment, the capsule body sections (114) may be filled by pharmaceutical and/or a nutraceutical ingredient.

According to the present invention, said control unit under a predetermined pressure is configured to displace said bottom (110) and top (120) closing units in synchronized time intervals.

According to the present invention, the biasing means (130) includes a spring.

According to the present invention, the body (B) and cap holders (C) include at least one row of predetermined diameters configured to accommodate plurality of the body (114) and cap sections (124).

Referring FIG. 2D shows the closing station in operation showing detection of capsules with only cap to be rejected, the cap is rejected because body is not sensed, according to the present invention. As seen in FIG. 2D the bottom pin (112) completely urges into the through-holes (O) of the body holder (B). However, the cap section (124) is not urged to initiate motion of the top pins (122). The control unit is configured to receive negative feedback signal generated by said first sensing means (150) and/or said second sensing means (160) indicative of non-biasing of said top pins (122) to said first and/or second predetermined threshold position, and non-telescoped capsule (180) with only cap section (124) and invoke a control signal based on said received negative feedback signal generated by said first and/or second sensing means (150, 160) to reject non-telescoped capsule (180).

Referring FIG. 2E shows the closing station in operation showing detection of capsules with only body to be rejected, the body is rejected because cap is not sensed, according to the present invention. As seen in FIG. 2E, the bottom pin (112) completely urges into the through-holes (O) of the body holder (B). However, the body section (114) is not urged to initiate motion of the top pins (122). The control unit is configured to receive negative feedback signal generated by said first sensing means (150) and/or said second sensing means (160) indicative of non-biasing of said top pins (122) to said first and/or second predetermined threshold position, and non-telescoped capsule (180) with only said body section (114) and invoke a control signal based on said received negative feedback signal generated by said first and/or second sensing means (150, 160) to reject non-telescoped capsule (180).

Referring FIG. 2F shows the closing station in operation showing detection of closed capsules but with a dent or improper fit of cap and body which is to be rejected, according to the present invention. The control unit is configured to receive a positive feedback signal generated by said first sensing means (150) and said second sensing means (160) on sensing biasing of said top pins (122) to first and a second predetermined threshold position, indicative of incomplete telescopic closure of capsule (190) having a dent either in said body section (114) or cap section (124), and invoke a control signal based on said received positive feedback signal generated by said first and second sensing means (150, 160) to reject dent capsule (190).

According to the present invention, the control unit is configured to control removal of only good capsules (170) from capsule holders based on the feedback signals.

According to another aspect, the present invention discloses a capsule filling machine comprising the closing station (100) including: a bottom closing unit (110) positioned underneath a body holder (B) of the capsule filling machine having a plurality of capsule body sections (114) therein, said bottom closing unit having a bottom pin (112) for each capsule body section (114) axially aligned with a corresponding vertical through-hole (O) of said body holder (B); a top closing unit (120) positioned overhead a cap holder (C) having a capsule cap section (124) therein for each capsule body section (114), said top closing unit having a top pin (122) for each cap section (124) axially aligned with a corresponding vertical through-hole (O) of said cap holder (C); at least one sensing means (140) configured to sense biasing of each said top pins (122) to a predetermined threshold position, indicative of complete telescopic closure of good capsule (170) with both said body section (114) and cap section (124); and a control unit in communication with said at least one sensing means (140) is configured to receive a positive feedback signal and invokes a control signal based on said generated positive feedback signal to segregate and remove only said good capsules (170) from capsule holders.

According to one another aspect, the present invention discloses a method of operating a closing station (100) of a capsule filling machine, the method comprising the steps of: initiating, by a control unit, a vertical displacement of a bottom closing unit (110) and a top closing unit (120) towards each other for urging bottom pins (112) to contact and slide closed ends of each capsule body sections (114) into open ends of each capsule cap sections (124); closing, by a control unit, cap (124) and body sections (114) of each capsule partially against an exerting pre-compressive force of said top pins (122); closing, by a control unit, cap (124) and body sections (114) of each said partially closed capsule telescopingly and completely against an exerting biasing force of a biasing means (130) positioned within said top pins (122); processing, by a control unit, plurality of received feedback signals generated by said first sensing means (150) and second sensing means (160); and invoking, by a control unit, a control signal based on said received positive feedback signal to segregate and remove only good capsules (170) having both said body sections (114) and cap sections (124) from capsule holders.

A good capsule is defined as a closed capsule having both body and cap sections without any formation of dent on surface of the capsule. A bad/rejected capsule is defined as capsule with either body section or cap section. The capsule is not completely closed. A dent capsule is defined as a closed capsule having both body and cap sections with dent on surface of the capsule. The controller is configured to eject only good capsules and reject bad and dent capsules.

According to an exemplary implementation, the control unit includes a processor configured to perform the above described features of a closing unit and a capsule filling machine.

According to another exemplary implementation, the control unit includes a PLC configured to perform the above described features of a closing unit and a capsule filling machine.

Thus, the present invention provides an improved capsule closing system which can operate to implement the method/technique of closing and segregation on a continuous basis to efficient manufacture of capsules with increasing handling capacity and eliminates the disadvantages and inconveniences inherent to the prior art conventional capsule sealing techniques and apparatuses. Accordingly, at least some of the technical and economic advantages provided by the present invention, include: efficient segregation of good and bad capsules before sealing of capsule, thereby reducing wastage ensuring no stoppage in the manufacturing cycle and providing efficient closing of capsules without any wastage due to the predetermined pressure applied during closing of capsules.

The present invention has been described in the context of a closing station having a top closing unit and a bottom closing unit and a body holder and a cap holder with plurality of bottom pins and top pins. However, number of top and bottom closing units and is not limited to those particularly described herein. Also, the closing station can have plurality of body and cap holder and sensing means and is not limited to those particularly described herein. The station can be made of any materials and biasing means is not limited to springs but any means that can provide biasing. Further, closing station as described herein can be modified according within the scope of the present invention and is not limited to the manner specifically described herein. The pre-compression force and force exerted against the spring of the top units is not limited to those particularly described herein.

In the foregoing detailed description of aspects embodiments of the invention, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus, the following claims are hereby incorporated into the detailed description of aspects, embodiments of the invention, with each claim standing on its own as a separate embodiment.

It is understood that the above description and drawings are intended to be illustrative, and not restrictive. Description and drawings are intended to cover all alternatives, modifications and equivalents as may be included within the spirit and scope of the invention as defined in the appended claims. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" is used as the plain-English equivalent of the respective term "comprising" respectively.

We claim:

1. A closing station (100) for a capsule filling machine, said station (100) comprising:

a bottom closing unit (110) positioned underneath a body holder (B) of the capsule filling machine having a plurality of capsule body sections (114) therein, said bottom closing unit having a bottom pin (112) for each capsule body section (114) axially aligned with a corresponding vertical through-hole (O) of said body holder (B);

a top closing unit (120) positioned overhead a cap holder (C) having a capsule cap section (124) therein for each capsule body section (114), said top closing unit having a top pin (122) for each cap section (124) axially aligned with a corresponding vertical through-hole (O) of said cap holder (C); and a control unit to:

initiate vertical displacement of said bottom (110) and top (120) closing units towards each other;

urge each said bottom pin (112) into said through-holes (O) of said body holder (B) to contact and slide closed ends of each capsule body sections (114) into said open ends of each capsule cap sections (124);

close cap (124) and body sections (114) of each capsule partially against an exerting pre-compressive force of said top pins (122); and close cap (124) and body sections (114) of each said partially closed capsule telescopingly and completely against an exerting biasing force of a biasing means (130) positioned within said top pins (122), wherein the control unit is in communication with a first sensing means (150) and a second sensing means (160) equidistantly spaced apart and positioned adjacent to said top pins (122) within said top closing unit (120), said control unit is to:

receive a positive feedback signal generated only by said first sensing means (150) on sensing biasing of said top pins (122) to only a first predetermined threshold position, indicative of complete telescopic closure of good capsule (170) having both said body section (114) and cap section (124);

receive a positive feedback signal generated by said first sensing means (150) and said second sensing means (160) on sensing biasing of said top pins (122) to first and a second predetermined threshold position, indicative of incomplete telescopic closure of capsule (190) having a dent either in said body section (114) or cap section (124); and receive negative feedback signal generated by said first sensing means (150) and/or said second sensing means (160) indicative of non-biasing of said top pins (122) to said first and/or second predetermined threshold position, and non-telescoped capsule (180) with either only said body section (114) or cap section (124).

2. The closing station (100) as claimed in claim 1, wherein said control unit is in communication with a sensing means (140) positioned within said top closing unit (120), said control unit is configured to:

receive a positive feedback signal generated by said sensing means (140) on sensing biasing of said top pins (122) to a predetermined threshold position, indicative of complete telescopic closure of good capsule (170) with both said body section (114) and cap section (124), and invoke a control signal based on said generated positive feedback signal to segregate and remove only said good capsules (170) from capsule holders.

3. The closing station (100) as claimed in claim 1, wherein said control unit is configured to:

invoke a control signal based on said received positive feedback signal generated by said first sensing means (150) to segregate and remove only said good capsules (170) from capsule holders;

invoke a control signal based on said received positive feedback signal generated by said first and second sensing means (150, 160) to reject dent capsule (190); and invoke a control signal based on said received negative feedback signal generated by said first and/or second sensing means (150, 160) to reject non-telescoped capsule (180).

4. The closing station (100) as claimed in claim 1, wherein said control unit is configured to displace said bottom (110) and top (120) closing units with a predetermined pressure in synchronized time intervals.

5. The closing station (100) as claimed in claim 1, wherein said biasing means (130) includes a spring.

6. The closing station (100) as claimed in claim 1, wherein said body (B) and cap (C) holders include at least one row of predetermined diameters configured to accommodate plurality of said body (114) and cap sections (124).

7. The closing station (100) as claimed in claim 1, wherein each said top pin (122) includes at least one stepped surface to aid biasing of said top pins (122).

8. The closing station (100) as claimed in claim 2, wherein said predetermined threshold position, first and/or second predetermined threshold positions, are determined by said control unit.

* * * * *